(12) United States Patent
Kroeker et al.

(10) Patent No.: US 6,390,448 B1
(45) Date of Patent: May 21, 2002

(54) SINGLE SHAFT DUAL CRADLE VACUUM SLOT VALVE

(75) Inventors: Tony R. Kroeker, Georgetown, TX (US); Gregory A. Tomasch, San Jose, CA (US)

(73) Assignee: Lam Research Corporation, Fremont, CA (US)

( * ) Notice: Subject to any disclaimer, the term of this patent is extended or adjusted under 35 U.S.C. 154(b) by 0 days.

(21) Appl. No.: 09/538,923

(22) Filed: Mar. 30, 2000

(51) Int. Cl.[7] .............................. B65G 49/07; F16K 3/10
(52) U.S. Cl. ........................ 251/167; 251/195; 251/296; 251/302; 414/217
(58) Field of Search ................................ 251/158, 167, 251/193, 195, 211, 215, 296, 302, 327; 414/217, 221; 137/613, 614.11, 614.13

(56) References Cited

U.S. PATENT DOCUMENTS

| | | | |
|---|---|---|---|
| 4,328,947 A | * 5/1982 | Reimpell et al. | 251/167 X |
| 4,721,282 A | * 1/1988 | Shawver et al. | 251/158 X |
| 5,002,255 A | 3/1991 | Sawa et al. | 251/193 |
| 5,076,205 A | 12/1991 | Vowles et al. | 118/719 |
| 5,292,393 A | 3/1994 | Maydan et al. | 156/345 |
| 5,562,800 A | 10/1996 | Kawamura et al. | 156/643.1 |
| 5,697,749 A | 12/1997 | Iwabuchi et al. | 414/217 |
| 5,769,952 A | 6/1998 | Komino | 118/733 |
| 5,820,104 A | 10/1998 | Koyano et al. | 251/326 |
| 6,079,693 A | * 6/2000 | Ettinger et al. | 251/195 |
| 6,095,741 A | * 8/2000 | Kroeker et al. | 414/217 |

FOREIGN PATENT DOCUMENTS

| | | | |
|---|---|---|---|
| EP | 63312574 | 12/1988 | ............. F16K/3/18 |
| EP | 377464 A2 | 11/1990 | ............. H01L/21/00 |
| EP | 05010460 | 1/1993 | ............. F16K/3/02 |
| EP | 07027235 | 1/1995 | ............. F16K/3/18 |
| FR | 851444 A | 10/1960 | |
| WO | WO99/61822 | 12/1999 | ............. F16K/3/18 |

* cited by examiner

*Primary Examiner*—John Kwon
*Assistant Examiner*—Eric Keasel
(74) *Attorney, Agent, or Firm*—Martine & Penilla, LLP

(57) ABSTRACT

A single slot valve shaft is in a vacuum body between adjacent vacuum chambers, such as a process module and a transport module. Separate valves are provided on the single shaft actuator for each of two valve body slots, each body slot being closed or opened according to the position of the single shaft. The separate valves allow a vacuum condition to be maintained in the transport module while an adjacent process module is open to the atmosphere for servicing. The single shaft allows access to an open valve for servicing the open valve by way of stops that limit drive travel and hold the valve in an open, but not vertically-spaced, position relative to a respective slot. The open valve is easily reached by a gloved hand of a service worker. The single shaft is mounted on a first cradle, and the first cradle is mounted on a second cradle. Two separate shaft drives move the two cradles to position the single shaft to locate the valves between the slots to open one slot and close the other slot. Another separate shaft drive moves the single shaft vertically down from the open position and away from the slots to expose seal surfaces around the slots for cleaning.

6 Claims, 9 Drawing Sheets

SINGLE SHAFT DUAL CRADLE VACUUM SLOT VALVE

BACKGROUND OF THE INVENTION

1. Field of the Invention

The present invention relates generally to valves for modules of semiconductor processing equipment, and more particularly to a single shaft actuator mounted on two cradle plates and carrying dual slot valves, and to methods of implementing such valves between separate chambers of semiconductor processing equipment, wherein at least one pivot of one cradle is vertically aligned with a mounting surface of a particular valve upon closure of the particular valve against a seal surface of the slot to provide movement of the particular valve perpendicularly toward the seal surface, and wherein operations may continue in one chamber during servicing of the other chamber, which semiconductor processing equipment may be a multi-chamber vacuum system.

2. Description of the Related Art

In the manufacture of semiconductor devices, multiple process chambers are interfaced to permit transfer of substrates or wafers, for example, between the interfaced chambers. Such transfer is via transport modules that move the wafers, for example, through slots or ports that are provided in the adjacent walls of the interfaced chambers. For example, transport modules are generally used in conjunction with a variety of substrate processing modules, which may include semiconductor etching systems, material deposition systems, and flat panel display etching systems. Due to the growing demands for cleanliness and high processing precision, there has been a growing need to reduce the amount of human interaction during and between processing steps. This need has been partially met with the implementation of transport modules which operate as an intermediate handling apparatus (typically maintained at a reduced pressure, e.g., vacuum conditions). By way of example, a transport module may be physically located between one or more clean room storage facilities where substrates are stored, and multiple substrate processing modules where the substrates are actually processed, e.g., etched or have deposition performed thereon. In this manner, when a substrate is required for processing, a robot arm located within the transport module may be employed to retrieve a selected substrate from storage and place it into one of the multiple processing modules.

As is well known to those skilled in the art, the arrangement of transport modules to "transport" substrates among multiple storage facilities and processing modules is frequently referred to as a "cluster tool architecture" system. FIG. 1 depicts a typical semiconductor process cluster tool architecture 100 illustrating the various chambers that interface with a transport module 106. Transport module 106 is shown coupled to three processing modules 108a–108c which may be individually optimized to perform various fabrication processes. By way of example, processing modules 108a–108c may be implemented to perform transformer coupled plasma (TCP) substrate etching, layer depositions, and/or sputtering.

Connected to transport module 106 is a load lock 104 that may be implemented to introduce substrates into transport module 106. Load lock 104 may be coupled to a clean room 102 where substrates are stored. In addition to being a retrieving and serving mechanism, load lock 104 also serves as a pressure-varying interface between transport module 106 and clean room 102. Therefore, transport module 106 may be kept at a constant pressure (e.g., vacuum), while clean room 102 is kept at atmospheric pressure. To prevent leaks between modules during pressure varying transitions, or to seal off a processing module from transport module 106 during processing, various types of gate drive valves are used to isolate the various modules.

For more information on gate drive valves, reference may be made to U.S. Pat. No. 4,721,282, which is hereby incorporated by reference. Another such gate drive valve is shown in U.S. Pat. No. 5,667,197, in which a prior art valve housing is shown having two port openings, and only one valve for one of the two port openings. Thus, it is not possible to close the port that does not have an associated valve. Also, the gate plate valve of the '282 Patent is shown for closing a port between abutting transport and process chambers, and no intermediate valve housing is provided. A drive assembly for the gate plate moves the gate plate in one continuous motion in a vertical path and in a rotating arc toward the internal port to effect a seal or closure of the internal port.

U.S. Pat. No. 5,150,882 shows one valve between various chambers of a treatment system, including between a decompression chamber and an etching chamber. Such one valve is driven for engagement and disengagement with a gate aperture by one air cylinder and a toggle arrangement such that stopper plates hit rollers with considerable impact. Initial vertical movement of a fitting plate is changed to horizontal movement by the link that is rotated counterclockwise, such that the gate moves toward the gate aperture. For the '882 Patent to avoid problems of the prior art, the stopper plates are made from a double boride hard alloy. Further, the single motion of the one air cylinder is not stopped, but instead continues its driving operation after the abutment of the stopper plates with the rollers. Thus, in addition to requiring special materials, the '882 Patent does not provide two valves between adjacent processing chambers.

Other valves for cluster tool architecture systems include a separate actuator for each of two valves, which tends to increase the width of a valve actuation housing or, when attempts are made to reduce such width, to restrict the location at which force is applied by the actuators to the valves. Also, such valves require a separate bellows for each of the two separate actuators. Because the cost of such bellows is substantial (e.g., in the range of $800.00 to $1000.00 each in year 2000 U.S. dollars), it is costly to require two bellows. Further, each such separate actuator is generally driven by a separate pneumatic cylinder, which also increases costs when one separate actuator is required for each of the two valves.

Still other valves for cluster tool architecture systems include one cradle having one pivot for mounting one actuator, wherein the one pivot is not movable into alignment with the valve seal surfaces of both of two valves carried by the one actuator.

In view of the forgoing, what is needed is a valve assembly between adjacent process or transport chambers, wherein the valve assembly has one shaft for dual valves, thus reducing the cost of the assembly by eliminating one bellows, and wherein one shaft is mounted on two pivotally-mounted cradles, and wherein at least one pivot of one cradle is vertically aligned with a mounting surface of a particular valve upon closure of the particular valve against a seal surface of the slot to provide movement of the particular valve perpendicularly toward the seal surface, and wherein one pneumatic drive of a two actuator dual valve is eliminated, and wherein operations in one such chamber may continue while servicing, for example, is performed in the other chamber.

SUMMARY OF THE INVENTION

Broadly speaking, the present invention fills these needs by providing a single shaft carrying a dual-sided slot valve in a housing between adjacent chambers or modules, such as a transport chamber and a process chamber. Separate selectively closed and opened valves are provided for each of two valve housing ports or slots, such that one housing port adjacent to the process chamber or one housing port adjacent to the transport chamber, for example, may be selectively closed while the other port remains open. For example, the selectively closed valve facilitates maintaining a vacuum, for example, in a transport chamber while an adjacent process chamber is opened to the atmosphere to allow servicing to be performed. As a result, substantial periods of downtime are avoided in that no pump-down cycle is needed to bring the transport chamber to a desired vacuum after servicing the process chamber, and no other operations need be performed on the transport chamber due to the servicing of the process chamber.

Also, with the valve to the transport chamber closed so that the transport chamber is at vacuum, the passage of debris (such as broken wafers) from the open process chamber may be blocked by the open valve to the process chamber so that such debris does not contaminate the transport chamber. Thus, in general, only the valve door next to the process chamber need be replaced during servicing after it becomes corroded, and the transport chamber may remain at vacuum during such replacement.

Further, the dual-sided slot valve is provided with these advantages while initially allowing easy access to one or both open valve(s) for performing service on the open valves. Such easy access is provided by a single shaft operated by a first drive mounted on a primary cradle, and operated by second and third drives mounted on a secondary cradle. To close one valve, the first drive is retracted to rotate the primary cradle, and the second drive is extended to rotate the secondary cradle on the primary cradle. The first and second drives stop with the one valve closed and the other valve in an open, but not laterally-spaced (i.e., not vertically-spaced), position relative to the respective port. If both valves are to be serviced, the first drive and the second drive are extended against stops to position both cradles so as to hold the single shaft centered in an open-shaft position and maintain an open position of each valve. In this open-shaft position the open valve or valves may be reached by a gloved hand of a worker for service.

The third drive may function to move the single shaft and cause both of the valves to move laterally (e.g., downwardly) away from the open position and away from the respective ports. The downwardly-moved open valves expose the seal surfaces around the ports, which permits cleaning of the seal surfaces, for example. Due to the vertical distance between the downwardly-moved valves and an access opening (which is normally closed by a lid), it is generally difficult for the protective glove of the worker to reach the valve for service after the vertical movement. In the downwardly-moved position, however, the valves do not interfere with the ability to clean around the valve doors, including the surfaces against which the doors seal.

Additionally, only the one shaft is provided for both of the slot valve doors so as to reduce the clean room real estate occupied by the valve housing between the adjacent transport and process chambers, for example. Also, such one shaft applies force to each of the slot valve doors at a central location of the slot valve door, which reduces the force required to maintain the slot valve door closed. Further, with only one shaft, only one bellows is required, as compared to the valve assemblies that have two actuators and that thus require two bellows.

In addition, with the single shaft mounted on two cradle plates and carrying the dual-sided slot valve, at least one pivot of one cradle is vertically aligned with a mounting surface of a particular valve upon closure of the particular valve against a seal surface of the slot to provide movement of the particular valve perpendicularly toward the seal surface.

It may be understood, then, that while normal operations continue in one chamber of two adjacent chambers, many types of servicing may be performed in the other of the two chambers. Such servicing may, for example, include removing broken pieces of wafers from a chamber or the valve housing, cleaning the seal surface of a port, cleaning the interior of a chamber, and removing and replacing a member of a valve (e.g., a door or an O-ring) that effects the seal with the seal surface. These and other operations for maintaining such chambers in normal operation for semiconductor processing, for example, are referred to herein as "servicing," or "service."

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by reference to the following detailed description in conjunction with the accompanying drawings, in which like reference numerals designate like structural elements.

DETAILED DESCRIPTION OF THE PREFERRED EMBODIMENTS

An invention is described for assuring that operations may continue in one module of a semiconductor process cluster tool architecture during servicing of another module. The invention is described in terms of valves for modules of semiconductor processing equipment, and more particularly in terms of a single valve shaft with a dual-sided slot valve, and methods of implementing such valves between separate modules of semiconductor processing equipment. It will be obvious, however, to one skilled in the art, that the present invention may be practiced without some or all of these specific details. In other instances, well known process operations have not been described in detail in order not to obscure the present invention.

Figure 1:
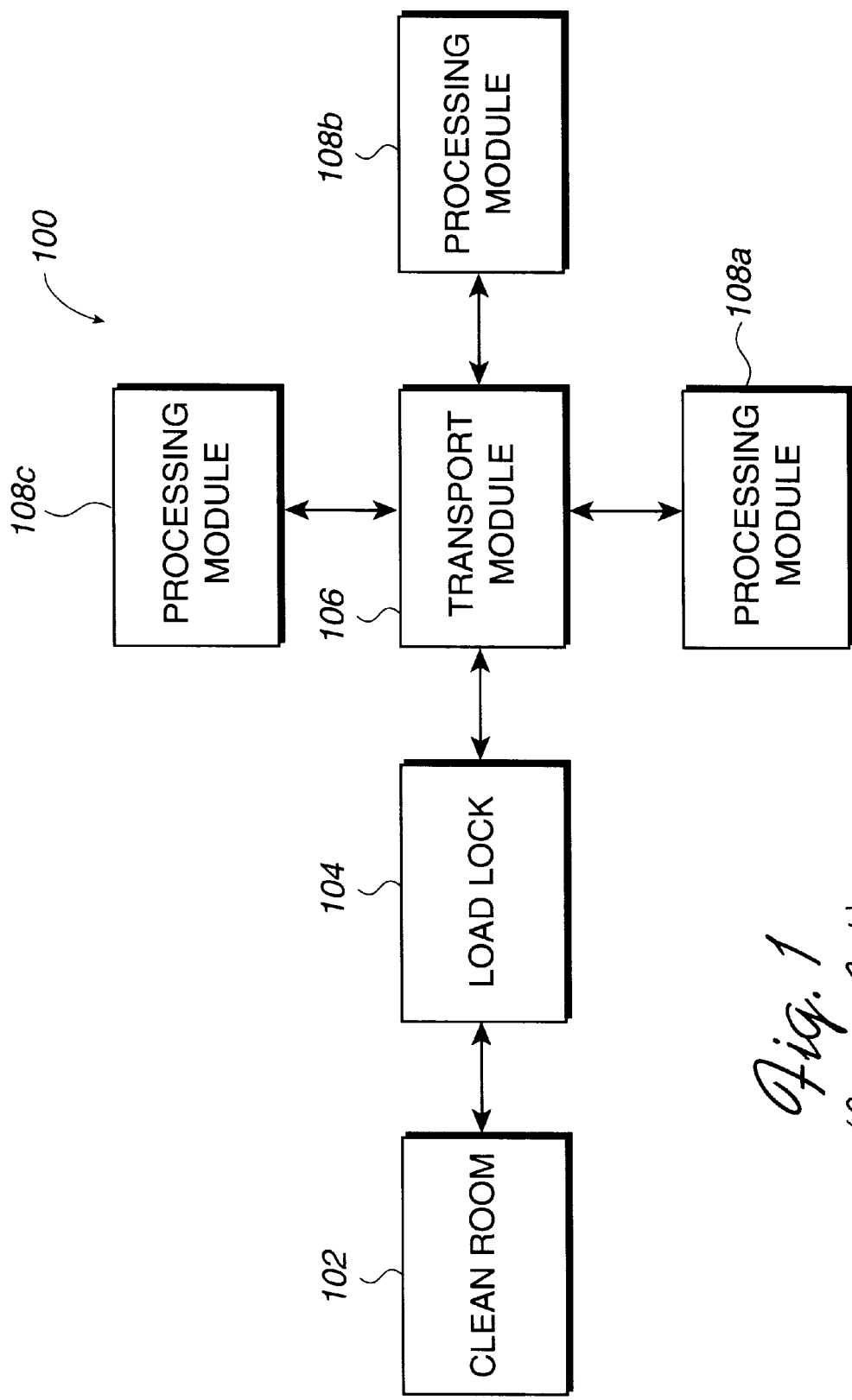
FIG. 1 depicts a typical prior art semiconductor process cluster tool architecture illustrating various process modules that interface with a transport module, wherein a single door valve is in one process or transport module such that the process and transport modules each must be shut down to enable servicing of either of the them.
Figure 2:
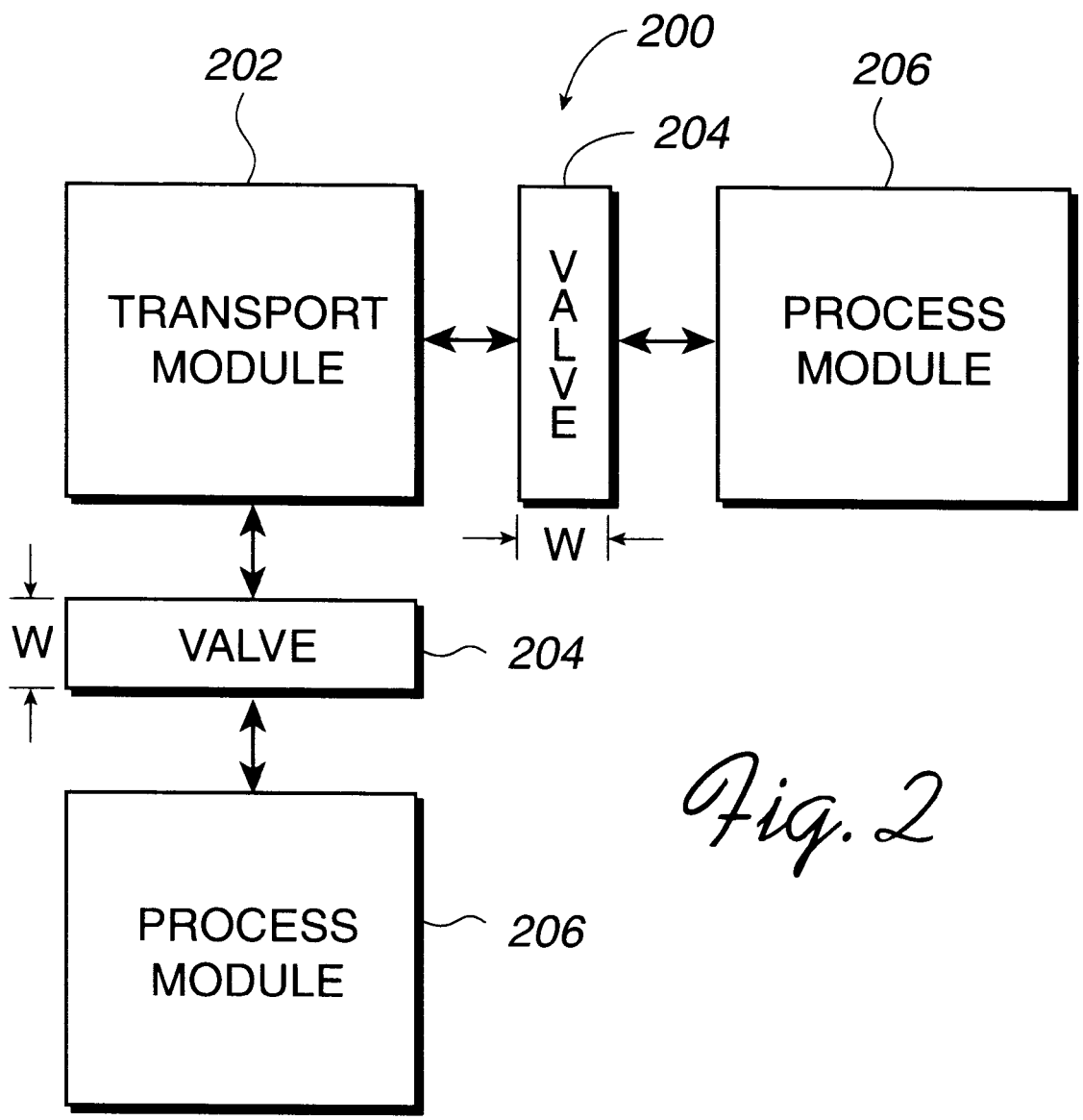
FIG. 2 depicts a dual-sided slot valve of the present invention located between adjacent ones of a transport module and a process module, wherein two door valves are in a valve vacuum body of a valve housing between the transport and process modules, such that only a selected one of the modules need be shut down to enable servicing of the selected one of them.

Referring to FIG. 2, the invention is generally described as including a semiconductor process cluster tool architecture 200 having a transport module 202 and process modules 206, wherein a dual-sided slot valve 204 is located between adjacent ones of the transport module 202 and the process module 206. Considering FIG. 2 as a plan view, a footprint of the architecture is defined by the combined floor area of the transport module 202, the process modules 206, and the dual-sided slot valves 204. It may be understood that the floor areas of the transport module 202 and the process modules 206 may be primarily dictated by considerations other than the manner in which the modules 202, 204 and 206 are sealed together for operations. The individual dual sided slot valves 204 define the manner in which the modules 202 and 206 are sealed together for operations, such that the footprint of each individual dual-sided slot valve 204 becomes significant in attempts to reduce the footprint of the cluster tool architecture 200. Thus, to reduce the footprint of each individual dual-sided slot valve 204 it is important to reduce the width W of each of the individual dual-sided slot valves 204 as much as possible.

Figure 3:
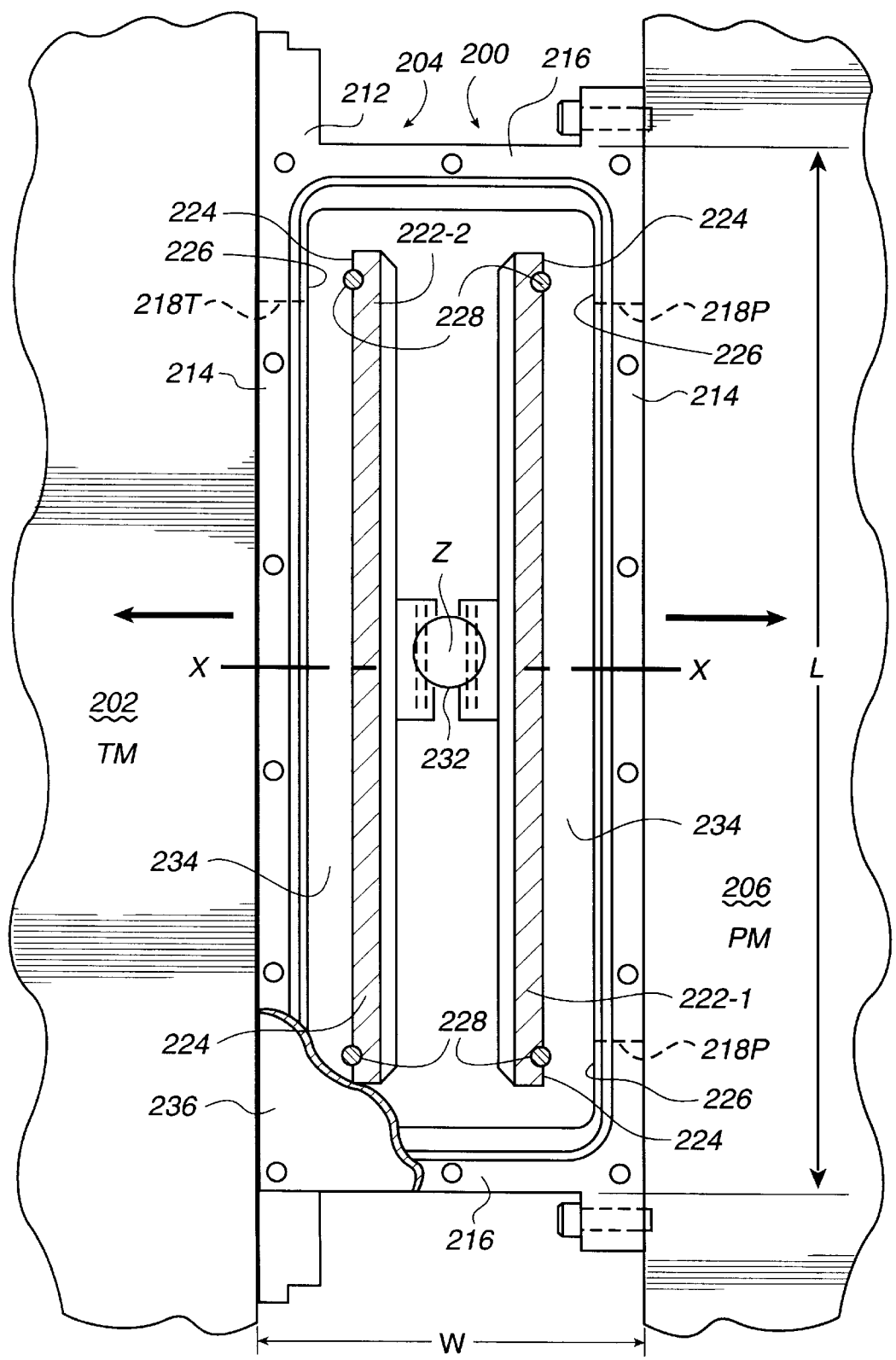
FIG. 3 is a plan view of the dual-sided slot valve of the present invention showing the valve vacuum body having a width defined by opposite walls, and a slot in each wall to permit wafers to be transferred from the transport module to the process module, wherein one slot may be selectively closed by one of the two door valves upon movement of one shaft to permit continued operations within the other module while the selected module is being serviced.

FIG. 3 shows one of the dual-sided slot valves 204 of the invention as including a valve vacuum body (or housing) 212 located between two modules of the cluster tool architecture 200. As shown, the two modules are the transport module 202 and one of the process modules 206, it being understood that valve vacuum body 212 may be located between any two modules of the cluster tool architecture 200. The valve vacuum body 212 has the width W defined by opposite walls 214. The side of each wall 214 nearest to the process module 206 may be referred to as the "PM side," whereas the side of each wall 214 nearest to the transport module 202 may be referred to as the "TM side." The valve vacuum body 212 has a length L defined by opposite end walls 216, where the width W times the length L defines the footprint of the individual dual-sided slot valve 204.

A port (or slot or opening) 218 is provided in each wall 214 to permit wafers (not shown), for example, to be transferred between one module and another module. As shown in FIG. 3, one such module is the transport module 202 and the other such module is the process module 206, with the slot 218P being adjacent to the process module 206 and the slot 218T being adjacent to the transport module 206. Each of the slots 218 is generally rectangular in shape and is smaller in each dimension than the generally rectangular shape of a door (or side door) 222 provided for closing the respective slot 218. In the case of the doors 222 and the slots 218, the corners are rounded, thus the respective rectangular shapes are referred to as "generally rectangular." Each of the doors 222 has a seal periphery 224 that overlaps an opposing seal surface 226 of the opposing wall 214 of the body 212. The seal periphery 224 may be provided with a seal device such as an O-ring 228 which is pressed against the seal surface 226 to provide a vacuum-tight, or gas-tight, seal when the door 222 is in a CLOSED position as described below. Alternatively, a seal device may be vulcanized to the door 222, or another type of seal device having a replaceable seal may be used. The door 222-2 at the wall 214 forms a pressure seal between the transport module 202 and the process module 206. In this manner, the PM side, for example, may be vented to atmosphere while the TM side remains at normal vacuum level (e.g., 80–100 mTorr). The valve 204 is also designed to allow the transport module 202 to be vented while the process module 206 is at vacuum, or to allow the process module 206 to be vented while the transport module 206 is at the vacuum level.

Referring to one of the doors 222, described as the door 222-1 and shown for example at the right as viewed in FIG. 3, the respective slot 218P may be selectively closed upon operation of a single shaft assembly 232. Use of the single shaft assembly 232 permits, for example, continued operations within the transport module 202 while the process module 206, for example, is being serviced. Therefore, only a selected one of the transport module 202 and the process module 206 need be shut down to enable servicing of the selected one of them. One result of actuation of the single shaft assembly 232 is to locate either door 222 in a CLOSED position, or in an OPEN position as shown in FIG. 3. The X axis designates a slightly arcuate path along which the doors 222 move from the CLOSED position to the OPEN position. In the OPEN position, either door 222 defines a space 234 between the door 222 and the wall 214. Another type of actuation of the actuator 232 is to locate the doors 222 in either a DOWN or an UP position, which positions are along a Z-axis shown in FIG. 3.

Figures 4A, 4B:
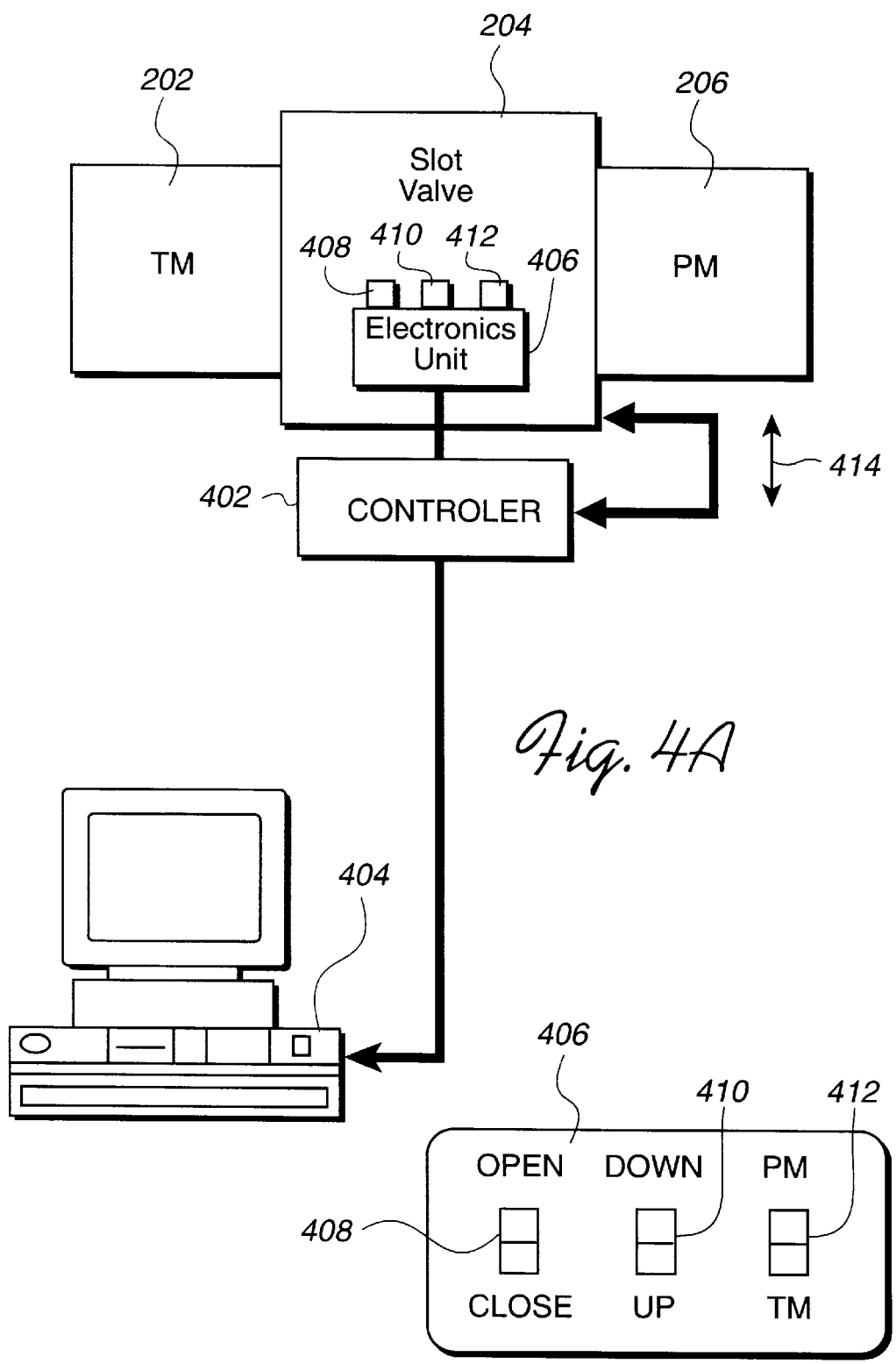
FIG. 4A is a schematic diagram of a controller for controlling the movements of a respective first door and a respective second door of the valve, wherein the controller is coupled to a computer workstation that is used to operate the dual-sided slot valve.
FIG. 4B depicts three switches for providing input to the controller to facilitate controlling the movements of the first door and the second door of the valve.

FIG. 4A shows the transport module 202, the process module 206, and one of the dual-sided slot valves 204. A controller 402 is connected to, and controls, the operation of the valve 204, including operation of the single shaft assembly 232 for controlling the doors 222-1 and 222-2. The controller 402 is connected to a computer workstation, or tool-embedded controller, 404. The controller 402 interfaces with the valve 204 via an electronics unit 406. FIG. 4B shows the top of the electronics unit 406 provided with a series of switches 408, 410, and 412, which are respectively for controlling the movement of the doors 222 into the OPEN and CLOSED positions, for controlling the movement of the doors 222 into the DOWN and UP positions, and for selecting which of the modules 202 and 206 is to be serviced (e.g., process module 206 is "PM"; and transport module 202 is "TM"). Examples of the signals 414 transmitted between the controller 402 and the slot valve 204 are "Open Door" and "Close Door".

Figure 5:
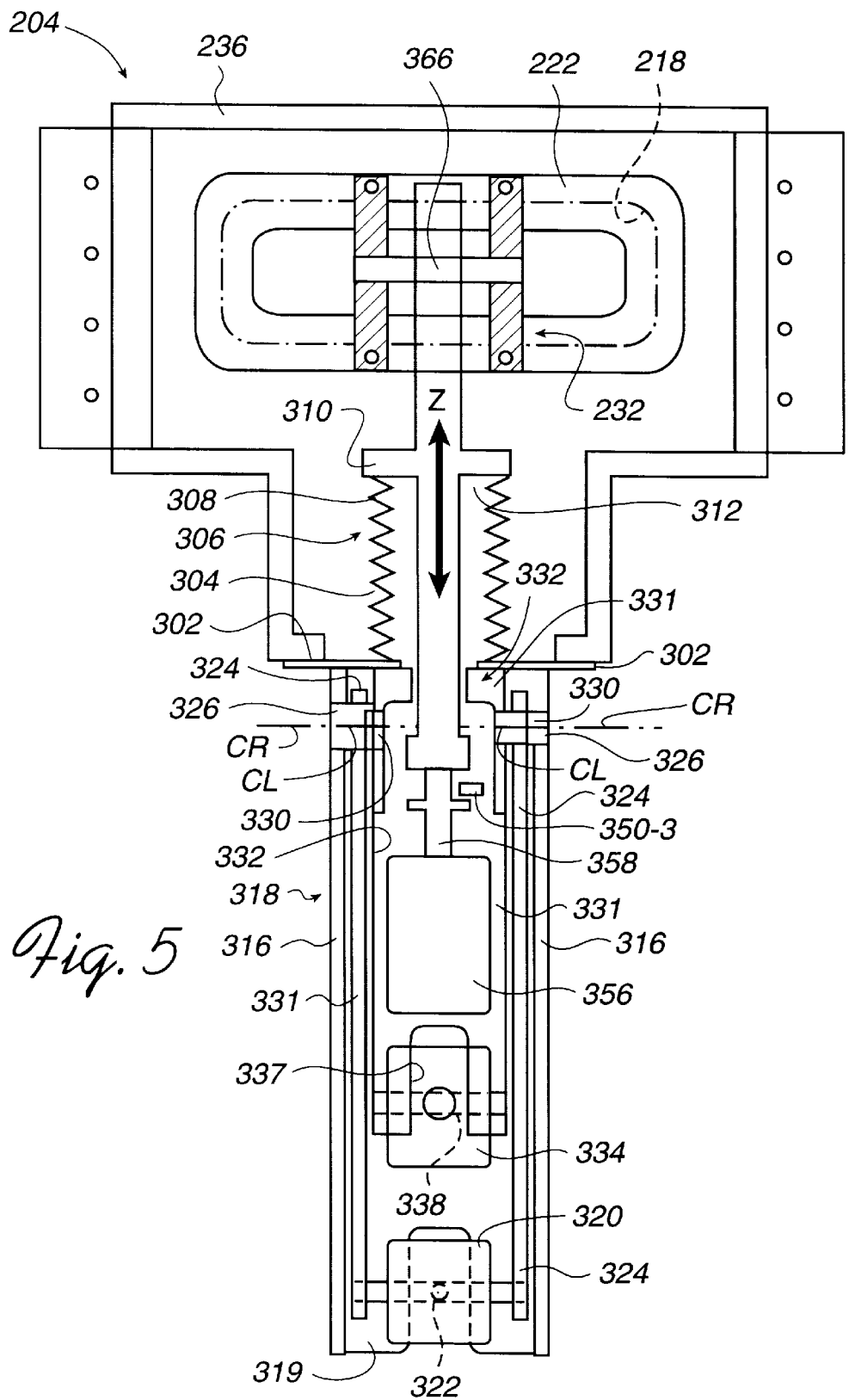
FIG. 5 is a vertical view of the dual-sided slot valve of the present invention showing the one shaft mounted on a secondary cradle, and the secondary cradle mounted on a primary cradle, wherein first and second motors on the respective primary and secondary cradles move the doors into an OPEN or a CLOSED position.
Figure 6A:
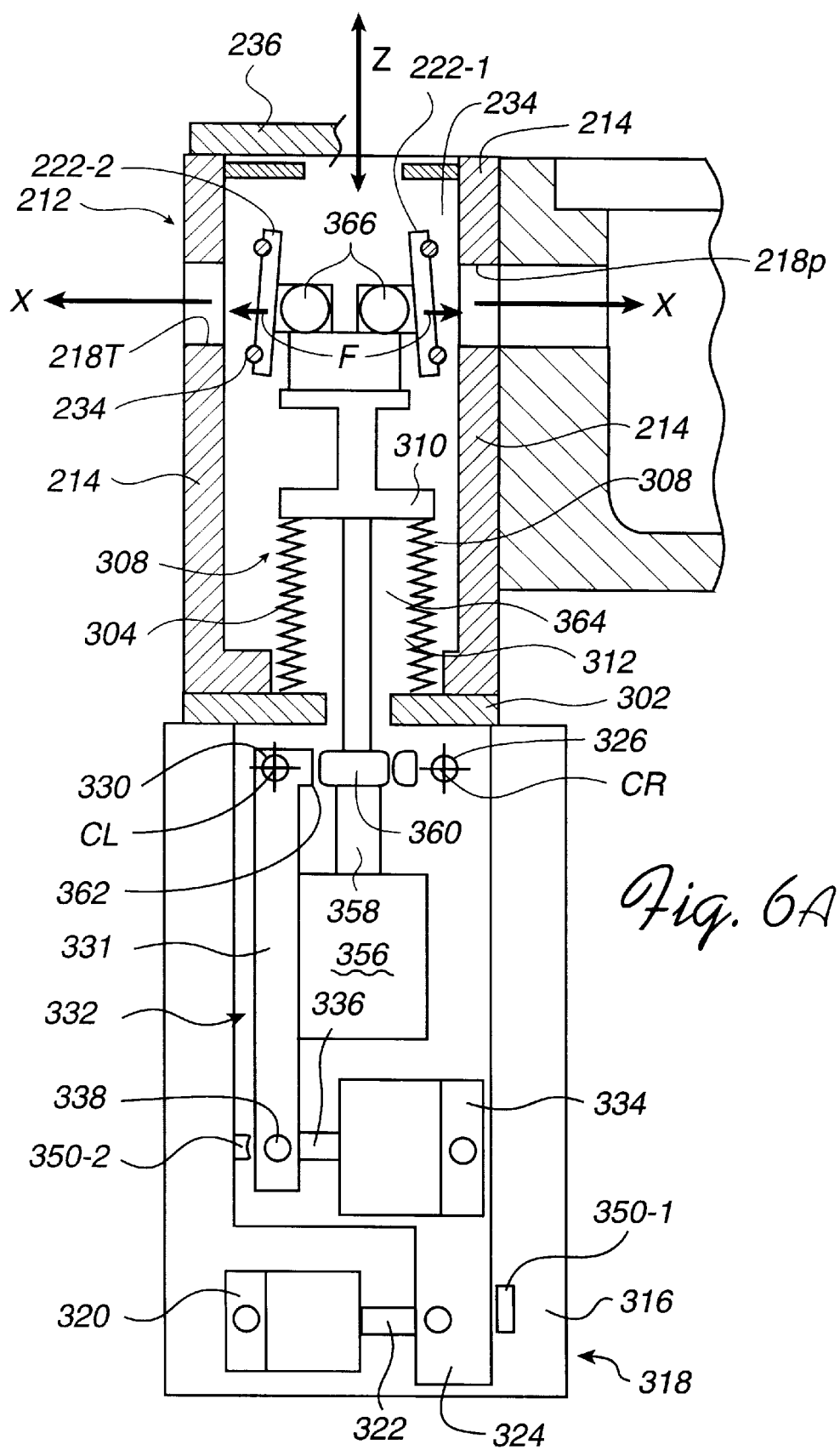
FIG. 6A is a vertical schematic view showing the two valve doors of the present invention in an OPEN and UP position, and showing the single shaft carrying the two doors.
Figure 6B:
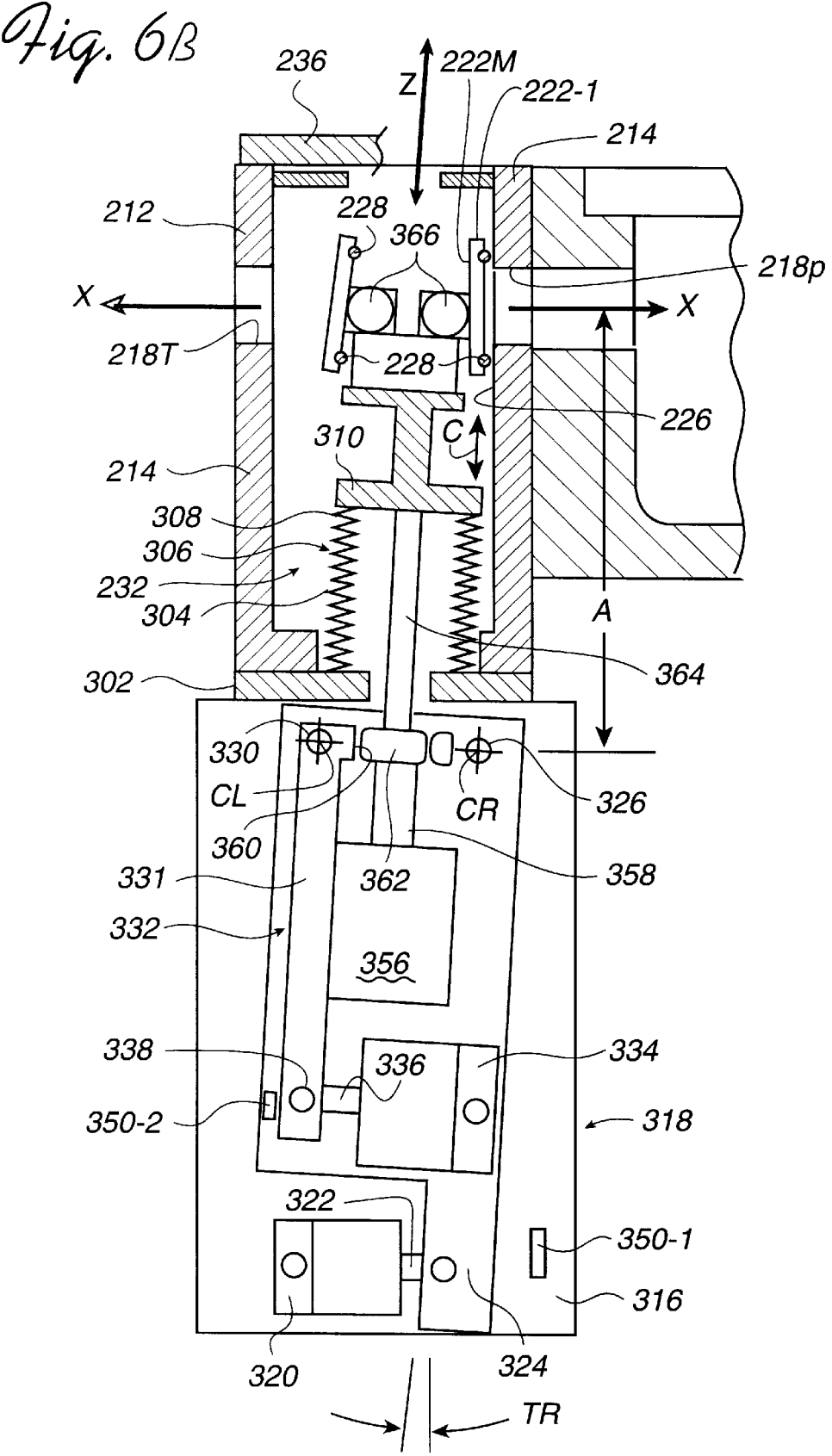
FIG. 6B is a vertical view similar to FIG. 6A showing a left side valve door of the present invention in a CLOSED and UP position to facilitate servicing of the other valve door.
Figure 6E:
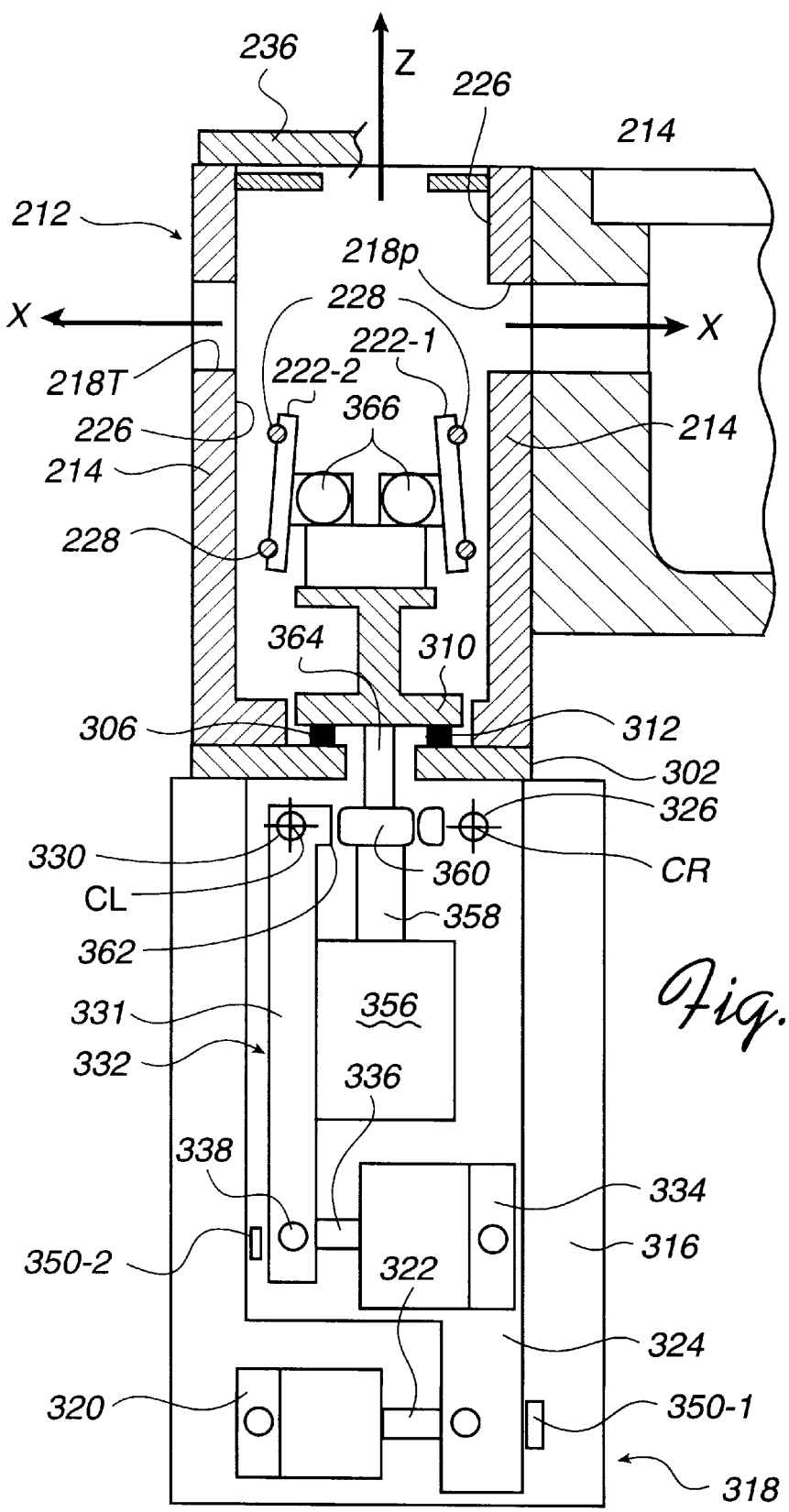
FIG. 6C is a vertical view similar to FIGS. 6A and 6B showing the two valve doors of the present invention in a DOWN and OPEN position to facilitate servicing of the valve slots.
FIG. 6D is a schematic view showing a right side valve door of the present invention in a CLOSED and UP position to facilitate servicing of the other valve door.
Figure 6D:
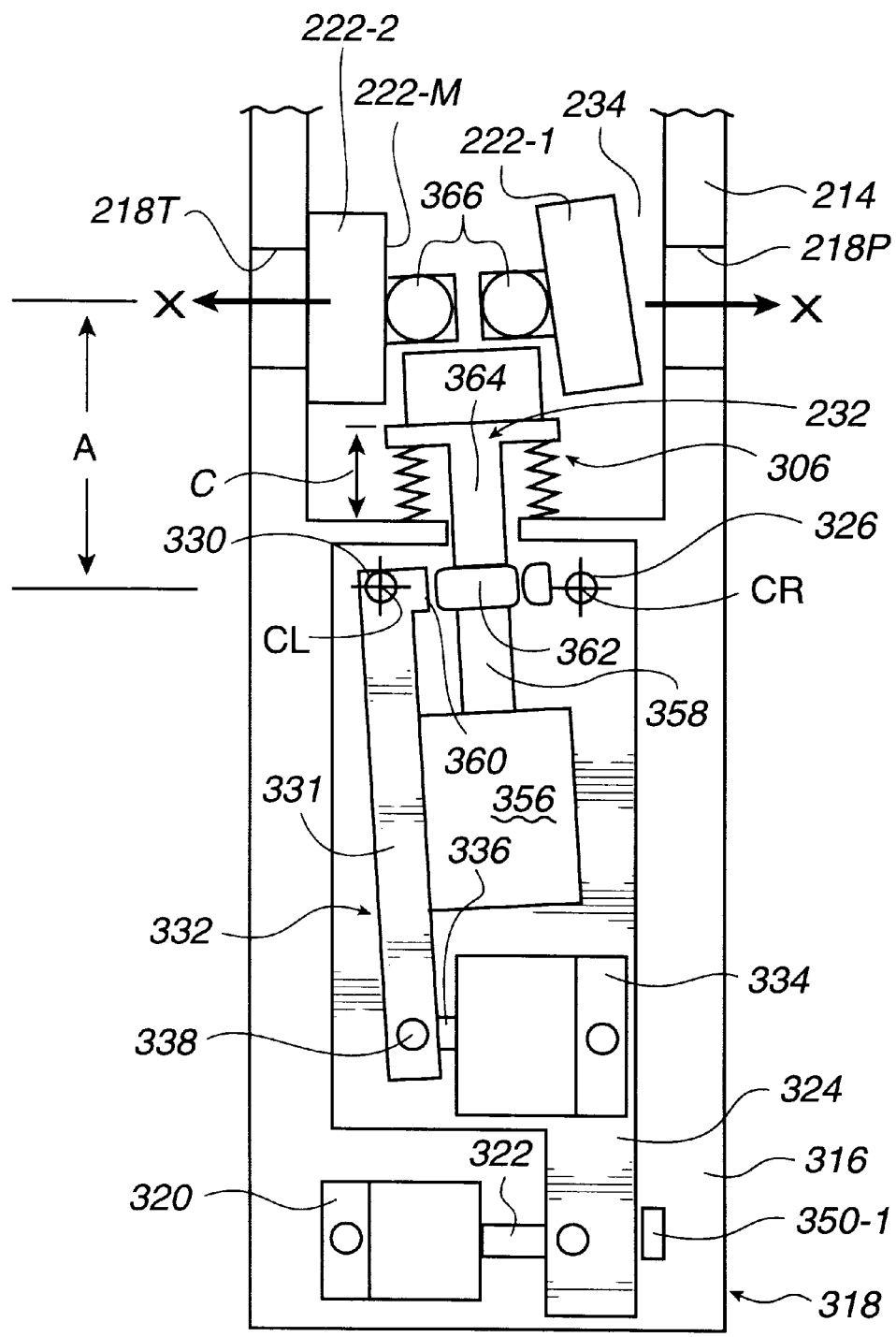

The single shaft assembly 232 is shown in FIGS. 5, and 6A–6D supporting the two doors 222-1 and 222-2 for movement as follows. In reference to FIG. 6B, movement of the closed door 222-1 is to the left to the OPEN position shown in FIG. 6A. As shown in FIG. 6D, movement of the closed door 222-2 is to the right to the OPEN position shown in FIG. 6A. As the seal periphery 224 of each door 222 approaches the seal surface 226 of the body 212 to close the respective slot 218, a mounting surface 222M of the door 222 that is being closed moves substantially perpendicularly toward the seal surface 226. Therefore, the X-axis is shown generally perpendicular to the planes of the walls 214 and to the planes of the seal surface 224 and mounting surface 222M. As described below, the single shaft assembly 232 is mounted on cradle axes CL and CR that are located relative to the doors 222 to provide such substantially perpendicular movement. FIGS. 6A–6D show that although the path of the doors 222-1 and 222-2 is somewhat arcuate relative to the cradle axes CL and CR, the radius of the arc is large enough that the OPEN position of the doors 222 may be said to be perpendicular to and away from the side walls 214 of the body 212. In the OPEN position, the doors 222 define the spaces 234 between the respective door 222 and the respective wall 214. With the doors 222 in the OPEN position, the easy access to the valve 204 for service, as noted above, is provided. The advantage of initially allowing easy access to the valve 204 in the OPEN and UP position shown in FIG. 6A, which position is not vertically down (i.e., not laterally-spaced), is that in the OPEN and UP position the doors 222 of the valve 204 may be reached by a gloved hand (not shown) of a service worker for service when a lid 236 is removed from the body 212.

The Z-axis corresponds to the above-referenced vertical, or lateral, direction or spacing, and is also shown in FIGS. 5, and 6A–6D. The Z-axis is the axis of the single shaft assembly 232 along which the doors 222 move into the UP and DOWN positions relative to the slots 218. Comparing FIG. 6A to FIG. 6B, it may be appreciated that the Z-axis moves, and in particular, rotates on the cradle axes CL and CR from a vertical orientation (FIG. 6A) to either one of the orientations shown in FIGS. 6B and 6D that are tipped, e.g., an angle TR or TL with respect to vertical. The change in orientation around the C-axes, and the distance A (FIG. 6D) from the C-axes to the center of the doors 222, results in the doors 222 moving along in the direction of the X axis from the CLOSED position shown in FIG. 6B (at which the O-rings 228 touch the seal surface 226), to the OPEN position shown in FIG. 6A, wherein the doors 222 are separated by the spaces 234 from the walls 214.

The single shaft assembly 232 is received in the upper valve vacuum body 212, which is mounted on top of a bottom plate 302. The body 212 has the slots 218P and 218T aligned with the X-axis, and has a top opening that is adapted to be sealed by the lid 236. A lower end 304 of a bellows 306 is sealingly attached to the bottom plate 302. An upper end 308 of the bellows 306 is sealingly attached to an upper bellows plate 310. With the bellows 306 sealed to the bottom plate 302 and to the upper bellows plate 310, and with the lid 236 sealed to the top of the valve vacuum body 212, the body 212 is strong enough to resist the forces of a vacuum applied through the slot 218P, for example. The bellows 306 has a hollow cylindrical shape defining a cavity 312.

FIG. 5 shows the bottom plate 302 secured to two spaced frame members 316 of a main pivot frame 318. The frame members 316 extend downwardly from the bottom plate 302 and may be mounted on a base (not shown) of the cluster tool architecture 200. Toward the bottom of the frame members 316, a bridge 319 is provided for mounting a first motor 320 to the frame members 316. The motor 320 may be a single acting pneumatic motor, for example, having a piston rod 322 connected to a primary cradle 324. The primary cradle 324 is mounted between and on the two spaced frame members 316 for rotation on the right axis CR. Opposed primary cradle pivots 326 coaxial with the right cradle axis CR provide the rotary support from the frame members 316 for the primary cradle 324. In FIG. 5, the pivot 326 for the left hand member 316 is shown extending through both the member 316 and the primary cradle 324, whereas the pivot 326 for the right hand member 316 is shown cut-away for purposes of illustration. In FIGS. 6A–6D, the opposed primary cradle pivots 326 are shown at the upper right side of the primary cradle 324.

As shown in FIGS. 6A, 6C, and 6D, the first motor 320 has a first, or extended, position in which the piston rod 322 positions the primary cradle 324 for an open door operation (FIGS. 6A and 6C) or for a left door 222-2 CLOSED operation (FIG. 6D). The first motor 320 also has a second, or retracted, position in which the piston rod 322 positions the primary cradle 324 for a right door 222-1 CLOSED operation (FIG. 6B).

FIGS. 6A–6D show the cradle axis CL located on the primary cradle 324. FIG. 5 shows opposed secondary cradle pivots 330 coaxial with the left cradle axis CL that provide rotary support from the primary cradle 324 for spaced arms 331 of a secondary cradle 332. In FIG. 5, the pivot 330 for the right hand arm 331 is shown extending through both the arm 331 and the primary cradle 324, whereas the pivot 326 between the right hand member 316 of the frame 318 and the right hand portion of the primary cradle 324 is shown cut-away for purposes of illustration.

In FIGS. 6A–6D, the opposed secondary cradle pivots 330 are shown at the upper left side of the secondary cradle 332. Thus, the secondary cradle 332 may rotate on the axis CL relative to the primary cradle 324. Such rotation is caused by a second motor 334 that is mounted on the primary cradle 324 for movement therewith. The second motor 334 may be a single acting pneumatic motor, for example, having a piston rod 336 connected to the secondary cradle 332. FIG. 5 shows the second motor 334 secured to the primary cradle 324 and the secondary cradle 332 cut away at a notch 337 to permit the rod 336 to join a pin 338 to rotate the secondary cradle 332 on the left axis CR and on the pivot 330.

The second motor 334 has a first, or extended, position in which the piston rod 336 positions the secondary cradle 332 for the open door operation (FIGS. 6A and 6C) when the first motor 320 is also in the first (extended) position. The second motor 334 also uses the first (extended) position for a right door 222-1 CLOSED operation (FIG. 6B) when the first motor 320 is in the retracted position. The second motor 334 also has a second, or retracted, position in which the piston rod 336 positions the secondary cradle 332 for a left door 222-2 CLOSED operation (FIG. 6D) when the first motor 320 is in the extended position.

The simultaneous extended positions of the piston rods 322 and 336 correspond to the doors 222 in the OPEN position, and are assured by the first and second motors 320 and 334 causing the respective piston rods 322 and 336 to press against respective stops 350-1 and 350-2, each of which limits the travel of the respective piston rod 322 or 336 and respective cradle 324 and 332.

The secondary cradle 332 also supports a third, or up/down, motor 356. With the up/down motor 356 fixed to the secondary cradle 332, a piston rod 358 may be extended or retracted and slides through a bearing 360 provided in an opening 362 in the secondary cradle 332. The bellows 306 has the cavity 312 with a hollow cylindrical shape for receiving a door-mount section 364 of the piston rod 358. As shown in FIGS. 6A–6C, such bearings 360 allow the piston rod 358 of the third (up/down) motor 356 to be extended or retracted and correspondingly move the bellows plate 310 up or down. The bellows plate 310 carries the door-mount section 364 which supports the two doors 222-1 and 222-2 for rotation on hinge pins 366. The door-mount section 364 is attached to the doors 222 centered with respect to a mid-point of each door 222, such that each of the doors 222 is supported by the section 364 centered about the longer side (or Y-axis dimension) of each respective door 222. As a result of the centered mounting of the doors 222 to the door-mount section 364, the closure force F (FIG. 6A) in the direction of the X axis applied by the door-mount section 364 to each door 222 is uniformly applied to each door 222, yet the one single shaft assembly 232 enables the width W of the body 212 to be substantially reduced from that of valves in which two separate actuators are provided in a valve body. In practice, the width W of the body 212 need only be about six and one-half inches, for example.

It may be understood from FIGS. 6A and 6C that when the piston rod 358 of the up/down motor 356 is extended, the doors 222 are in the UP position (FIGS. 6A, 613 and 6D) with the bellows 306 extended. When the piston rod 358 of the up/down motor 356 is retracted the doors 222 are moved into the DOWN position (FIG. 6C) with the bellows 306 collapsed, so that a direct line of sight is provided between the slots 218T and 218P, allowing transport of a wafer (not shown) between the modules 202 and 206. It may be understood then, that the single shaft assembly 232, with the separate motors 320 and 334 operates to simultaneously move the doors 222 in a first direction of the X-axis generally perpendicular to the respective first and second walls 214-1 and 214-2 of the body 212. If the doors 222 are in the OPEN position the assembly 232 moves the doors 222 in a second (lateral or vertical) direction generally parallel to the walls 214 of the body 212.

As described above, the single shaft assembly 232 supports the two doors 222-1 and 222-2, and the X axis designates a slightly arcuate path along which the doors 222 move from the CLOSED position to the OPEN position. Movement of the closed door 222-1 was said to be to the left to the OPEN position shown in FIG. 6A, and as shown in FIG. 6D movement of the closed door 222-2 is to the right to the OPEN position shown in FIG. 6A.

As the primary cradle 324 rotates clockwise in FIG. 6B on the right axis CR, for example, the left cradle axis CL moves upwardly relative to the primary cradle axis CR. The secondary cradle axis CL thus becomes positioned above the primary cradle axis CR when the right door 222-1 is closed. As the primary cradle 324 rotates counterclockwise from the right door CLOSED position shown in FIG. 6B to the left door CLOSED position shown in FIG. 6D, the cradle axis CL moves downwardly relative to the primary cradle axis CR, until the left door 222-2 is closed and the axes CR and CL are at the same level along the Z axis. Due to the spacing of the axes CR and CL in the direction of the X axis, and due to such movement of the axis CL relative to the axis CR, the following benefit may be understood. As the seal periphery 224 of each door 222 approaches the seal surface 226 of the body 212 to close the respective slot 218, the location of respective cradle axes CL and CR at the time of such closure is such that one achieves a desirable movement of the mounting surface 222M of the door 222 that is being closed. The spacing and location of the cradle axes CL and CR, and the single shaft assembly 232 mounted on the two cradles 324 and 332 carrying the dual-sided slot valve 204, result in at least one pivot (or axis CL or CR) of one cradle 324 or 332 being vertically aligned with the mounting surface 222M of a particular door 222 upon closure of the particular door 222 against the respective seal surface 226 of the respective slot 218 to provide movement of the particular door 222 perpendicularly toward the seal surface 226 (for example, see vertical alignment arrows C in FIGS. 6B and 6D). This desirable movement of such mounting surface 222M is substantially perpendicular to the seal surface 226. Such perpendicular movement better assures proper seating of the O-ring 228 onto the seal surface 226.

The unmet needs of the prior art cluster tool architecture 100 are filled by the above-described dual-sided slot valve 204 in the vacuum body 212 between the adjacent modules 206 and 202, such as the transport module 202 and the process module 206. One of the separate doors 222 is provided on the single shaft assembly 232 for each of the two valve housing ports 218, such that one housing port 218P adjacent to the process module 206 and one housing port 218T adjacent to the transport module 202, for example, may be selectively closed while the other port remains open. For example, the selective closure facilitates maintaining a vacuum in the transport module 202 while the adjacent process module 206 is opened to the atmosphere to allow servicing to be performed. As a result, substantial periods of downtime are avoided in that no pump-down cycle is needed to bring the transport module 202 to a desired vacuum after servicing the process module 206, and no other operations need be performed on the transport module 202 due to the servicing of the process module 206. Furthermore, the total productivity of the cluster tool architecture 200 is enhanced because by keeping the transport module 202 under vacuum, one allows production to continue using the transport module 202 while servicing of the one process module 206 is performed.

Also, with the door valve 222-2 to the transport module 202 closed so that the transport module may be at vacuum, the passage of debris (such as broken wafers, not shown) from the open process module 206 may be blocked by the open door valve 222-1 associated with the process module 206 so that such debris does not contaminate the transport module 202. Thus, in general, only the valve door 222-1 next to the process module 206 need be replaced during servicing after it becomes corroded, and the transport module 202 may remain at vacuum during such replacement.

Further, the dual-sided slot valve 204 is provided with these advantages while initially allowing easy access to one or both open door valve 222 for performing service on the open door valves 222. Such easy access is provided by the single shaft assembly 232 operated by the first, second, and third drives 320, 334 and 356.

As shown in FIG. 5, to close one door valve 222 (such as the left door 222-2), the third motor 356 is extended against a stop 350-3. The primary motor 324 is actuated (extended) against the respective stop 350-1 and thus is held stopped. The primary motor 324 thus holds the primary cradle 324 in the vertical position (FIG. 6A) and the second motor 334 is actuated (retracted) into the door CLOSED position shown in FIG. 6D to tip the secondary cradle 332 and cause the left door valve 222-2 to be in the CLOSED position, with the right door 222-1 in the OPEN position, and both door valves 222 in the UP position.

If both valves 222 are to be serviced, the primary motor 320 and the secondary motor 334 are actuated (extended) and are urged against the respective stops 350-1 and 350-2. The cradles 324 and 332 are thus held vertical (FIG. 6A) with the doors 222 in the OPEN, centered position. In this OPEN position the open door valve 222 or door valves 222 may be reached by a gloved hand of a worker for service. The third motor 356 may then move the door mount 364 of the single shaft assembly 232 and cause both of the door valves 222 to move laterally (i.e., downwardly) away from the OPEN position and away from the respective ports 218 into the DOWN position shown in FIG. 6D to expose the seal surfaces 226 around the ports 218. Such exposure permits cleaning of the seal surfaces 226, for example.

Due to the vertical distance between the laterally-moved door valves 222 and an access opening 262 (which is normally closed by the lid 236), it is generally difficult for the protective glove of the worker to reach the door valves 222 for service after the vertically downward movement. In the laterally downward moved position, however, there is a clear line of sight between the ports 218T and 218P such that the door valves 222 do not interfere with the worker's ability to clean around the door valves 222, including the surfaces 226 against which the door valves 222 seal, and a wafer (not shown) may be transported from one module to the next module.

Additionally, only one single door mount 364 is provided for both of the slot valve doors 222 so as to reduce the width W and thus reduce clean room real estate occupied by the valve housing 212 between the adjacent transport module 202 and process module 206, for example. Also, such single door mount 364 applies the force F to each of the slot valve doors 222 at the central location of the slot valve door 222, which reduces the value of the force F required to maintain the slot valve door 222 closed. Further, with only one single door mount 364, only one bellows 306 is required, as compared to other valve assemblies that have two actuators and that thus require two bellows.

It may be understood, then, that while normal operations continue in one module (e.g., 202) of two adjacent modules 202 and 206, many types of servicing may be performed in the other of the two modules (e.g., one adjacent process module 206). Such normal operations may, for example, allow use of the transport module 202 with another process module 206 that is also adjacent to the transport module 202, enhancing the total, or overall, productivity of the cluster tool architecture 200. Such servicing of the one process module 206 may, for example, include removing broken pieces of wafers from the one process module 206 or the valve housing 212, cleaning the seal surface 226 of a port 218, cleaning the interior of the one process module, and removing and replacing a member of a valve 204 (e.g., a door 222 or an O-ring 228).

These benefits are obtained while the desired movement of the mounting surface 222M is achieved. Thus, as the seal periphery 224 of each door 222 approaches the seal surface 226 of the body 212 to close the respective slot 218, the location of respective cradle axes CL and CR at the time of such closure enables the mounting surface 222M of the door 222 that is being closed to be substantially perpendicular to the seal surface 226. Such perpendicular movement better assures proper seating of the O-ring 228 onto the seal surface 226.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A dual-sided slot valve for use in a semiconductor process cluster tool architecture arrangement, the dual-sided slot valve comprising:

a housing having a first side and a second side, the housing having a first slot at the first side and a second slot at the second side to permit transport of a substrate between a first module and a second module, the first module being attached to the first side of the housing and the second module being attached to the second side of the housing;

a first door movably mounted within the housing to enable closure of the first slot;

a second door movably mounted within the housing to enable closure of the second slot;

a single shaft connected to each of the first and second doors; and a dual-cradle assembly carrying the single shaft for selectively and separately moving either of the first and second doors to a closed position to close the respective slot, the dual-cradle assembly comprising:

a frame supporting the housing;

a first cradle mounted on the frame for movement relative to the housing;

a second cradle mounted on the first cradle for movement relative to the housing; and the single shaft being mounted on the second cradle so that the movement of each of the first and second cradles relative to the housing changes the position of the single shaft within the housing to open or close a selected one of the slots.

2. A dual-sided slot valve according to claim 1, the dual-cradle assembly further comprising:

a drive for moving each of the cradles in a first common direction to move the single shaft and close one of the slots.

3. A dual-sided slot valve according to claim 1, the dual-cradle assembly further comprising:

a drive for moving each of the cradles in a first common direction to move the single shaft and close one of the slots and in a second common direction to move the single shaft and close the other one of the slots.

4. A dual-sided slot valve for use in a semiconductor process cluster tool architecture arrangement, the dual-sided slot valve comprising:

a housing having a first side and a second side, the housing having a first slot at the first side and a second slot at the second side to permit transport of a substrate between a first module and a second module, the first module being attached to the first side of the housing and the second module being attached to the second side of the housing;

a first door movably mounted within the housing to enable closure of the first slot;

a second door movably mounted within the housing to enable closure of the second slot;

a single shaft connected to each of the first and second doors, the single shaft having a central position, when the single shaft is in the central position each of the first door and the second door being placed in an open position that is spaced from and between each of the first slot and the second slot; and a dual-cradle assembly carrying the single shaft for selectively and separately moving either of the first and second doors to a closed position to close the respective slot, the dual-cradle assembly comprising:

first and second cradles; and a separate drive for each of the cradles, each separate drive having an extended position, the separate drives in the respective extended positions holding the single shaft in the central position so that the first door and the second door are held in the open position;

the first cradle being mounted for rotation relative to the housing and carrying the second cradle, the second cradle carrying the single shaft and being mounted for rotation relative to the first cradle, each of the separate drives also having a retracted position.

5. A dual-sided slot valve according to claim 4, further comprising:

a controller for operating the separate drives, the controller causing one of the separate drives to be in the extended position and the other of the separate drives to be in the retracted position to move the first and second doors along a valve open-closed path to and from the respective open and closed positions for selectively and separately moving either of the first and second doors to a closed position to close the respective slot.

6. A dual-sided slot valve for use in a semiconductor process cluster tool architecture arrangement provided with a process module and a transport module, the dual-sided slot valve comprising:

a vacuum body having a first process module side and a second transport module side, the vacuum body having a process module slot at the first side and a transport module slot at the second side for allowing transport of a substrate between the process module and the transport module, the process module being attached to the first side of the body and the transport module being attached to the second side of the body, the first side of the body having a first wall surface and the second side of the body having a second wall surface;

a single shaft having a door-mount end movable in the body toward and away from each of the process module slot and the transport module slot along a closure path, the door-mount end being movable away from the body along an access path that is generally perpendicular to the closure path to provide a line of clear sight between the process module slot and the transport module;

a first door mounted to the door-mount end of the single shaft for movement along the closure path to open and close the process module slot;

a second door mounted to the door-mount end of the single shaft for movement along the closure path to open and close the transport module slot;

the first and second doors being mounted by the single shaft for movement along the access path between an up position and a down position, the down position being away from the line of sight to permit accessing of the slots and the respective wall surfaces adjacent to the slots;

a dual-cradle assembly for carrying the single shaft so that the door-mount end moves along the access path and the closure path, the dual-cradle assembly having first and second cradles, the first cradle being mounted for rotation on a first axis on the second cradle, the second cradle being mounted for rotation on a second axis on the vacuum body; and a shaft drive mechanism on the dual-cradle assembly, the mechanism having a first drive mounted on the dual-cradle assembly for moving the door-mount end of the single shaft in the body toward and away from each of the process module slot and the transport module slot along the closure path, the shaft drive mechanism having a second drive for moving the shaft drive mechanism door-mount end toward and away from the body along the access path;

the single shaft being mounted on the first cradle;

the first drive being mounted on the first and second cradles for rotating the first and second cradles and moving the door-mount end of the actuator in the body toward and away from each of the process module slot and the transport module slot along the closure path; and the second drive being mounted on the first cradle for moving the door-mount end toward and away from the body along the access path.

* * * * *